(12) United States Patent
Margonis et al.

(10) Patent No.: US 9,202,198 B2
(45) Date of Patent: Dec. 1, 2015

(54) COMPUTER-IMPLEMENTED METHOD FOR MANAGING COMMODITY CONSUMPTION WITHIN AN INDUSTRIAL PRODUCTION FACILITY (75) Inventors: Elias Margonis, Houston, TX (US); Charles Neely Harper, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 998 days.

(21) Appl. No.: 12/969,949

(22) Filed: Dec. 16, 2010

(65) Prior Publication Data
US 2011/0251938 A1 Oct. 13, 2011

Related U.S. Application Data (60) Provisional application No. 61/321,996, filed on Apr. 8, 2010.

(51) Int. Cl.
*G07F 19/00* (2006.01)
*H04M 15/00* (2006.01)
*G06Q 30/04* (2012.01)
*G06Q 10/10* (2012.01)

(52) U.S. Cl.
CPC ............... *G06Q 10/10* (2013.01); *G06Q 30/04* (2013.01)

(58) Field of Classification Search
CPC .............................. G06Q 30/04; G06Q 20/102
USPC .......................................................... 705/34
See application file for complete search history.

(56) References Cited

U.S. PATENT DOCUMENTS

| | | | | |
|---|---|---|---|---|
| 5,963,925 A * | 10/1999 | Kolling et al. | ................... | 705/40 |
| 7,562,037 B2 * | 7/2009 | Wright | ............................ | 705/34 |
| 7,647,136 B2 * | 1/2010 | McDowell | ..................... | 700/282 |
| 2002/0002513 A1 * | 1/2002 | Chiasson | ........................ | 705/27 |
| 2002/0010666 A1 * | 1/2002 | Wright | ............................ | 705/34 |
| 2002/0038279 A1 * | 3/2002 | Samuelson et al. | ............. | 705/37 |
| 2002/0115447 A1 * | 8/2002 | Martin et al. | ................. | 455/456 |
| 2002/0188530 A1 * | 12/2002 | Wojcik et al. | .................... | 705/28 |
| 2003/0018490 A1 * | 1/2003 | Magers et al. | ..................... | 705/1 |
| 2003/0055776 A1 * | 3/2003 | Samuelson | ........................ | 705/37 |
| 2004/0078153 A1 * | 4/2004 | Bartone et al. | .................. | 702/57 |
| 2004/0210526 A1 * | 10/2004 | Brown | ............................ | 705/40 |
| 2006/0020544 A1 * | 1/2006 | Kaveski | .......................... | 705/40 |
| 2008/0082215 A1 * | 4/2008 | McDowell | ..................... | 700/282 |
| 2008/0103993 A1 * | 5/2008 | Wilson et al. | .................. | 705/412 |
| 2008/0177678 A1 * | 7/2008 | Di Martini et al. | ........... | 705/412 |
| 2010/0145492 A1 * | 6/2010 | Russell | ......................... | 700/103 |

OTHER PUBLICATIONS

PCT ISR and Written Opinion for PCT/US2011/31547.

* cited by examiner

*Primary Examiner* — Seye Iwarere
(74) *Attorney, Agent, or Firm* — Elwood L. Haynes (57) ABSTRACT

Techniques are disclosed for managing certain aspects of a large industrial operation (such as a pipeline). A commodity materials invoice system may allow a user to model a commodity invoice as a template and subsequently use that template to model commodity usage for different periods of time. Costs for a given billing period may be estimated based on actual commodity consumption. For example, data from a SCADA system monitoring different aspects of a pipeline may be used to estimate invoice costs for retail commodity consumption. The commodity materials invoice system may be configured to present both estimated and actualized invoice data side-by-side, allowing users to make a direct comparison of the estimated and actualized invoice data.

14 Claims, 7 Drawing Sheets

| Charge # | Charge Name | | | |
|---|---|---|---|---|
| 1 | Energy Usage | | | |
| 2 | On Peak Demand | | | |
| 3 | Off Peak Demand | | | |
| 4 | ... | | | |
| 5 | Energy Charge | | | |
| 6 | On Peak Demand Charge | | | |
| 7 | Off Peak Demand Charge | | | |
| 8 | Customer Charge | | | |

Template Code: Electric Supplier #1  Commodity: Power  Account: 03780689703
Vendor: Electric Supplier #1  Location: Production Facility #1  * Effective: 12/01/2009

| Charge Type | Unit | Rate | Formula |
|---|---|---|---|
| Energy | KWH | 0 | |
| Demand | KW | 0 | |
| Demand | KW | 0 | |
| Usage | 103M3 | | |
| Energy | KWH | 0.02829 | [Energy Usage ]*[Rate] |
| Demand | KW | 9.35 | [Rate]*[On Peak Demand] |
| Demand | KW | 0.84 | [Rate]*[Off Peak Demand] |
| Charge | USD | 1,353 | [Rate]*1 |

Bill Template Preview — 510

| Include | Charge Name | Charge Type | Cost Type | Sort Order | Unit | Est Value | Est Cost | Act Cost | Billed Cost |
|---|---|---|---|---|---|---|---|---|---|
| ☑ | Energy Usage | Energy | N | 1 | KWH | 0 | $0 | $0 | $0 |
| ☑ | On Peak Demand | Demand | N | 2 | KW | 0 | $0 | $0 | $0 |
| ☑ | Off Peak Demand | Demand | N | 3 | KW | 0 | $0 | $0 | $0 |
| | Usage | | | 4 | 103M3 | | | | |
| ☑ | Energy Charge | Energy | Y | 5 | KWH | 0 | $0 | $0 | $0 |
| ☑ | On Peak Deman... | Demand | Y | 6 | KW | 0 | $0 | $0 | $0 |
| ☑ | Off Peak Deman... | Demand | Y | 7 | KW | 0 | $0 | $0 | $0 |
| ☑ | Customer Charge | Charge | Y | 8 | USD | 0 | $0 | $0 | $0 |

Est Total: 0.0  Act Total: 0.0  Billed Total: 0.0
$/KW: 0.0  $/KW: 0.0  $/KW: 0.0

Formula Preview — 515
[Rate] * [Off-Peek Demand]

COMPUTER-IMPLEMENTED METHOD FOR MANAGING COMMODITY CONSUMPTION WITHIN AN INDUSTRIAL PRODUCTION FACILITY

CROSS-REFERENCE TO RELATED APPLICATIONS

This application claims the benefit of U.S. Provisional Application No. 61/321,996, filed Apr. 8, 2010, the entire contents of which are incorporated herein by reference.

BACKGROUND

Generally, a pipeline system provides a continuous pipe conduit that includes a variety of components and equipment, e.g., valves, compressor stations, communications systems, and meters. A pipeline may be used to transport liquid or gaseous materials from one point to another, usually from one point (or points) of production or processing to another, or to points of use. That is, a producer may deliver product to customers through the pipeline. For example, an air separation unit (ASU) may be used to separate atmospheric air into gaseous components (e.g., oxygen gas ($O_2$), nitrogen gas ($N_2$), hydrogen gas ($H_2$), Argon gas (Ar), etc.) delivered to a variety of customers at downstream points along a pipeline. At compressor stations, compressors maintain the pressure of the material in the pipeline as it is transported. Similarly, for a liquid bearing pipeline, pumps may be used to introduce and maintain pressure for a liquid substance transported by the pipeline.

Obviously, running and maintaining a collection of ASUs used to generate gaseous oxygen (and other substances) delivered through pipeline system is a complex endeavor. To manage this complexity, the operations of a pipeline system may be coordinated and controlled from a central operations control center. At such a control center, an operator may monitor process data related to the operational state of the ASUs, the pipeline and each of its constituent elements using a SCADA (Supervisory Control and Data Acquisition) system. Other complex industrial systems and processes use a similar approach. For example, a petroleum refinery (at one end of a pipeline) may be monitored from a central control center using a real-time status database configured to receive data collected from the field devices of the refinery. Similarly, electrical generation facilities, chemical production or processing facilities, steel mills, manufacturing plants, assembly lines, etc., are frequently monitored using on a centralized operations control center.

In addition to the operational complexity of these types of large industrial operations, managing the financial side of such an operation presents a substantial challenge. Among other things, e.g., an operator needs to monitor the amount of commodity materials (e.g., electricity, natural gas, etc.) consumed in generating product for delivery customers. The amount (and source) of different commodity materials used in production may greatly impact the profitability of the overall operation. Further, the operator may have a variety of different pricing arrangements with different commodity suppliers (of both the same and different commodities). Some such arrangements may be regulated (e.g., electricity subject to a rate tariff) contractual (e.g., a requirements contract), while others commodities supplies may simply be subject to market forces. Further still, a pipeline operator may have a variety of customers each with a distinct set of contractual requirements that affect how much the pipeline operator may charge or pass on different commodity costs, e.g., for minimum volume delivery, price points for different instantaneous flow rates, force majeure requirements, pass through requirements (what costs of production are passed on to the customer), and price adjustments, etc.

SUMMARY

Embodiments of the invention provide techniques for managing commodity consumption in a large industrial network, such as a pipeline. One embodiment of the invention includes a method for managing commodity consumption within an industrial production facility. The method may generally include receiving a definition of a billing template for each of a plurality of commodity suppliers. Each commodity supplier provides a commodity material consumed by the industrial production facility, and the billing templates each specify a set of line-items modeling an invoice received from a respective one of the commodity suppliers. The method may also include receiving a request to view an invoice, for a specified billing period, for a selected one of the commodity suppliers and include generating a view of the requested invoice. The view may include a first display area for rendering one or more of the set of line items as estimated invoice data and a second display area for rendering one or more of the set of line items as actualized invoice data. The method may also include displaying, in response to the request to view the invoice, the generated view, including the first display area and the second display area.

Another embodiment of the invention includes a non-transitory computer-readable medium containing a retail commodity manger, which when executed on a processor is configured to perform an operation for managing commodity consumption within an industrial production facility. The operation itself may include receiving a definition of a billing template for each of a plurality of commodity suppliers. Each commodity supplier provides a commodity material consumed by the industrial production facility, and the billing templates each specify a set of line-items modeling an invoice received from a respective one of the commodity suppliers. The operation may further include receiving a request to view an invoice, for a specified billing period, for a selected one of the commodity suppliers generating a view of the requested invoice. The view may include a first display area for rendering one or more of the set of line items as estimated invoice data and a second display area for rendering one or more of the set of line items as actualized invoice data. The operation may also include displaying, in response to the request to view the invoice, the generated view, including the first display area and the second display area.

Still another embodiment of the invention includes a system having a processor and a memory storing a retail commodity manger, which when executed on the processor performs an operation for managing commodity consumption within an industrial production facility. The operation itself may include receiving a definition of a billing template for each of a plurality of commodity suppliers. Each commodity supplier provides a commodity material consumed by the industrial production facility, and the billing templates each specify a set of line-items modeling an invoice received from a respective one of the commodity suppliers. The operation may further include receiving a request to view an invoice, for a specified billing period, for a selected one of the commodity suppliers generating a view of the requested invoice. The view may include a first display area for rendering one or more of the set of line items as estimated invoice data and a second display area for rendering one or more of the set of line items as actualized invoice data. The operation may also include displaying, in response to the request to view the invoice, the generated view, including the first display area and the second display area.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 7 illustrates an example user interface for a commodity invoice manager, according to one embodiment of the invention.

DESCRIPTION OF PREFERRED EMBODIMENTS

Embodiments of the invention include a commodity materials invoice system used to manage certain aspects of a large industrial operation (such as a pipeline). In a particular embodiment, the commodity materials invoice system allows users to manage and track costs associated with retail commodities such as electricity, natural gas, third party purchases, as well as other commodities. The commodity materials invoice system allows a pipeline operator to estimate and actualize retail commodity costs in real-time for a broad variety of different commodities. That is, the commodity materials invoice system allows the pipeline operator to estimate costs (e.g., based on estimates of a commodity used during a billing period) and actualize them at a later date (e.g., based on an invoice from a commodity supplier). The estimated (and actualized) costs may model a broad variety of retail commodity costs including the ability to model percentage based calculations (e.g., taxes), on- and off-peak demand pricing, block pricing, and the like.

In one embodiment, a user composes a commodity invoice as a billing template and subsequently uses that template to model commodity usage for different periods of time, i.e., for a given billing period. Costs for a given billing period may be estimated based on actual commodity consumption. For example, data from a SCADA system monitoring different aspects of a pipeline may be used to estimate invoice costs for retail commodity consumption. In one embodiment, the SCADA system may provide a real-time status database (which reflects the current process data of the industrial system) and a historian database (which archives the process data from the industrial system as it changes over time). For example, the real-time database may provide the current commodity consumption rates for each ASU, the demand-pull from the pipeline by each customer, and the like. Similarly, the historian database may include each real-time volumetric accumulation previously received. Using this information, estimates of commodity usage may be used to populate the fields of the template for a given period.

Importantly, the estimated invoice costs represented in the billing template may be modeled on the actual invoice form (and rate structure) used by the provider of a given commodity. Thus, in contrast to currently available products, the commodity materials invoice system provides an operator with the ability to model invoices from different suppliers and to track counter parties costs in a retail-based structure that mirrors the actual invoices from each counter party. Further, a user may attach documents to an invoice generated for a given billing period, providing users with instant access to the cost data pertaining to a specific counterparty, product and/or period of time, all in one system. Thus, the commodity materials invoice system provides a centralized collection of commodity invoice data (both actualized and estimated) that may facilitate profit and loss sheet reporting as well as facilitate a billing system configured to invoice customers for the pass-through costs of certain commodity costs incurred by the pipeline operator. Further still, data from the commodity materials invoice system may be used to optimize the operations of the pipeline. For example, an optimization process may evaluate the estimated commodity costs to determine a recommended solution to where to obtain commodity products from during a given billing period.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified herein.

A particular embodiment of the invention is described using a pipeline as an example of a large industrial operation managed using the commodity materials invoice application and system described herein. However, it should be understood that embodiments of the invention may be adapted for use with a broad variety of industrial systems with complex billing requirements including, e.g., electrical generation facilities, chemical production or processing facilities, steel mills, manufacturing plants, assembly lines, etc. Accordingly, references to a pipeline system are merely illustrative and not limiting.

Figure 1:
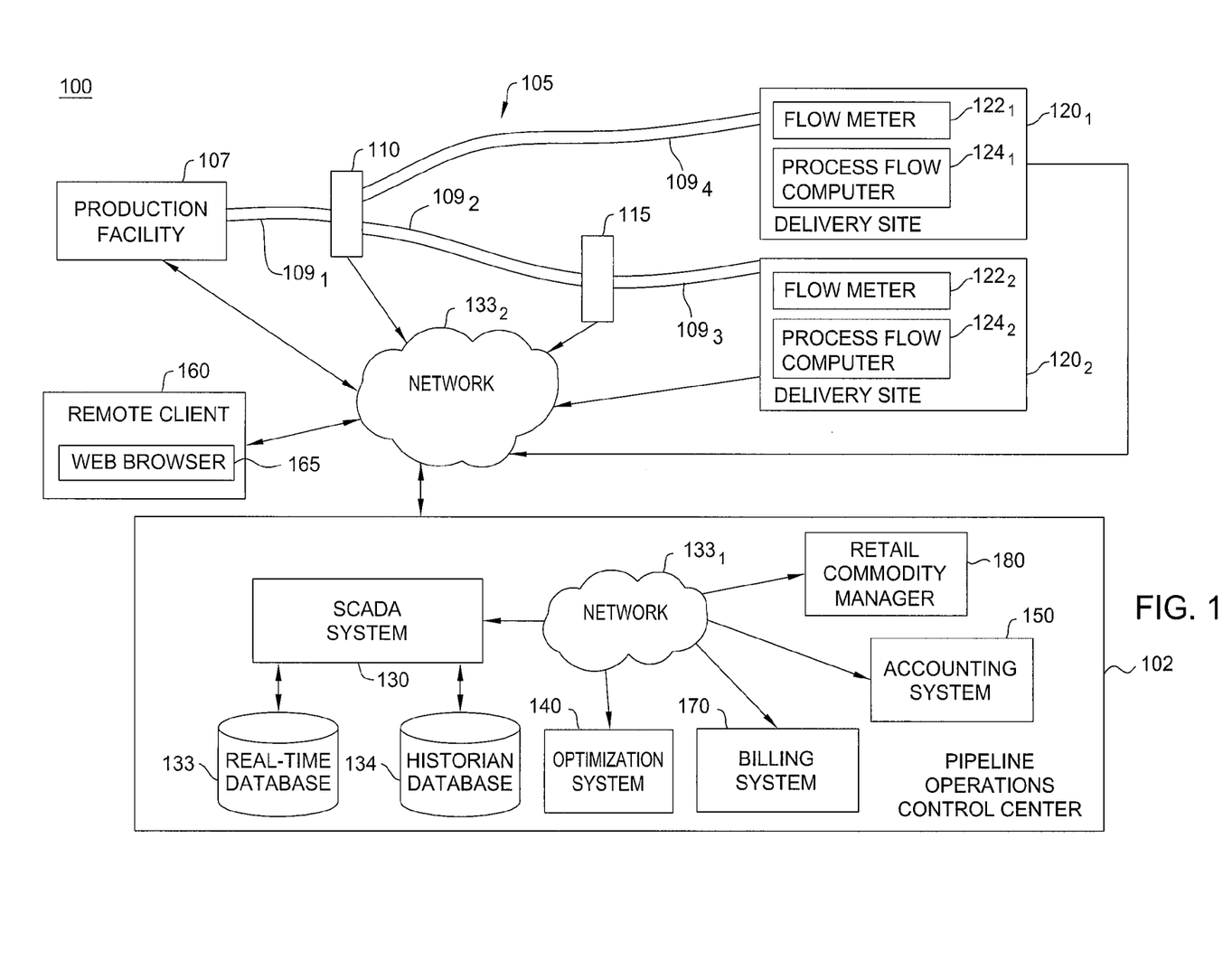
FIG. 1 is an illustration of a monitored pipeline and an operations control center, according to one embodiment of the invention.

FIG. 1 is an illustration of a system 100 that includes a monitored pipeline 105 and an operations control center 102, according to one embodiment of the invention. As shown, a pipeline 105 connects a production/processing facility 107 and two product delivery sites $120_{1-2}$. Production facility 107 may represent, for example, a molecular gas generation plant that includes one or more air separation units (ASUs) used to purify gaseous substances from the atmosphere. The resulting product is delivered to stations $120_{1-2}$ over the pipeline 105. Illustratively, pipeline 105 includes pipeline segments $109_{1-4}$. Pipeline segments $109_1$, $109_2$, and $109_3$, provide a path from production facility 107 to delivery site $120_2$ and pipeline segments $109_1$ and $109_4$ provide a path from production facility 107 to delivery station $120_1$. Additionally, pipeline 105 includes compressor stations 110 and 120 used to maintain the pressure of gaseous substances as it is transported over pipeline 105 from the production facility 107 to the delivery sites $120_{1-2}$.

The production facility 107 and the compressor stations 110 and 115 may include sensor equipment used to monitor aspects of the operational state of the pipeline 105. For a pressurized gas pipeline, for example, a wide variety of field devices and parameters may be monitored including, for example, inlet gas pressure, outlet gas pressure, gas temperature, cooling liquid temperature, flow rates, and power consumption, among others. Similarly, the operational state of various field devices, air separation units, and equipment at production facility 107 and delivery stations $120_{1-2}$ may be monitored by sensor equipment. For example, the amount of electricity, natural gas, or other retail commodity consumed by the ASU may be monitored by sensor equipment. Of course, for other industrial networks and systems, the sensors and monitoring equipment may be selected to suit the needs of a particular case. Illustratively, delivery sites $120_{1-2}$ each include a respective flow meter $122_{1-2}$ and a process flow computer $124_{1-2}$. In one embodiment, the flow meters $122_{1-2}$ may be configured to sample the instantaneous flow rates of product taken from the pipeline 105 by the delivery stations $120_{1-2}$, at a specified interval (e.g., once every second). Similarly, sensors at the production facility 107 and compressor stations 110, 115 may monitor the instantaneous rates of commodity consumption.

The rates determined by the flow meter $122_{1-2}$ may be transmitted to the respective process flow computer $124_{1-2}$. In turn, the process flow computer $124_{1-2}$ receives the sampled flow rate and updates the volume accumulated in one or more volume groups. In one embodiment, the volumes accumulated by the process flow computers 124 may be transmitted to the operation control center 102 over network $133_2$ at periodic intervals, e.g., once an hour. Sensors at a variety of points in the pipeline 105 may also transmit information regarding the operational state of pipeline 105 to the operation control center 102 over network $133_2$, as represented by the arrows connecting the production facility 107, compressor stations 110 and 115, and delivery sites $120_{1-2}$ to network $133_2$. The pipeline operation control center 102 may employ a number of computer systems running application programs used to coordinate, monitor, and control the operations of pipeline 105, including a retail commodity manger 180 configured to manage and track costs associated with retail commodities such as electricity, natural gas, third party purchases, and any other commodity used in generating and/or delivering product to the delivery sites $120_{1-2}$.

Illustratively, the pipeline operations control center 102 includes a SCADA (Supervisory Control and Data Acquisition) system 130, a real-time database 133 and a historian database 134 an accounting system 150, a billing system 170, and the retail commodity manger 180, each communicating over a network $133_1$. Additionally, a computing system may provide a remote interface to the computing systems at the operations control center 102. Thus, as shown, the remote client 160 communicates over network $133_1$ with the computer systems of the operations control center 102. For example, a user may interact with a web-browser 165 to access SCADA data over the network $133_1$. The computer systems 130, 133, 134, 150, 160, 170, and 180 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 130, 133, 134, 150, 160, and 170 are simplified to highlight aspects of the present invention and that computing systems and networks typically include a variety of components not shown in FIG. 1.

In one embodiment, the SCADA 130 system is configured to gather data in real-time from sensors on the pipeline 105, the production facility 107, and from the process flow computers $124_{1-2}$ at the delivery sites $120_{1-2}$ in order to control equipment and monitor conditions in the pipeline 105. As noted above, e.g., in context of this disclosure, the SCADA system 130 may receive volumetric accumulations of retail commodity consumption, such as electricity, natural gas, third party purchases, and any other commodity used in generating and/or delivering product to the delivery sites $120_{1-2}$, as well as receive accumulations of product delivered to each delivery site 120$_{1-2}$. In one embodiment, commodity consumption data may be tied to the product delivered to one of the delivery sites 120$_{1-2}$. Alternatively, however, the commodity consumption data may reflect commodity usage without being differentiated for multiple customers.

Monitored data received from sensors in the pipeline 105 may be stored in real-time database 133. In one embodiment, the real-time database 133 generally stores the last known value for each element or component of an industrial system (e.g., pipeline 105) monitored using system 100. That is, the real-time database 133 may store data values each representing a monitored parameter of pipeline 105 and the current operational value of that parameter, e.g., the most recent rate of electricity consumption used by an ASU at the production facility 107. Such a parameter could be updated, e.g., each minute in order to continually reflect a then current electricity consumption of the ASU.

The data may be written into real-time database 133 periodically, where values are updated at regular intervals, or exception based, where a new values are written into real-time database 133 only when the monitored value changes more than a predetermined value. In turn, the retail commodity manager 180 may use the commodity accumulation data to estimate retail invoice values for commodities consumed from each of multiple suppliers. Similarly, the billing system 170 may be configured to estimate customer invoices based on the accumulated volumes, external factors (e.g., pass through amounts such as the cost of electricity), and on any billing adjustments specified in an agreement between the producer and consumer of product delivered through pipeline 105. The historian database 134 may be configured to retrieve (or receive) the values for monitored parameters from real-time database 133. Thus, the historian database 134 provides an archive of values from the real-time database 133. The retail commodity manager 180 could use such data to create an estimated invoice for a billing period—tracking the cost of the electricity based on (1) the actual consumption data and (2) the rate tariff of the electricity provider. That is, the retail commodity manager 180 may query the real-time database 133 and the historian database 134 to populate the billing template composed for a particular commodity provider. Further, such data may be used, e.g., to compare an estimate of commodity consumption for a given billing period with an actual invoice of commodity consumption for that same period when it is subsequently received from a commodity vendor.

Of course, the appearance, behavior, and capabilities of interfaces made available by the retail commodity manager 180 and the billing system 170 may be tailored to suit the needs of a particular case. Further, although SCADA system 130, real-time database 133, historian system 134, accounting system 150, billing system 170, and the retail commodity manager 180 are shown as separate components, one of ordinary skill in the art will recognize that these components may be applications running on a single computer system, or on multiple computer systems, and further, that these components may be configured in a variety of ways.

Figure 2:
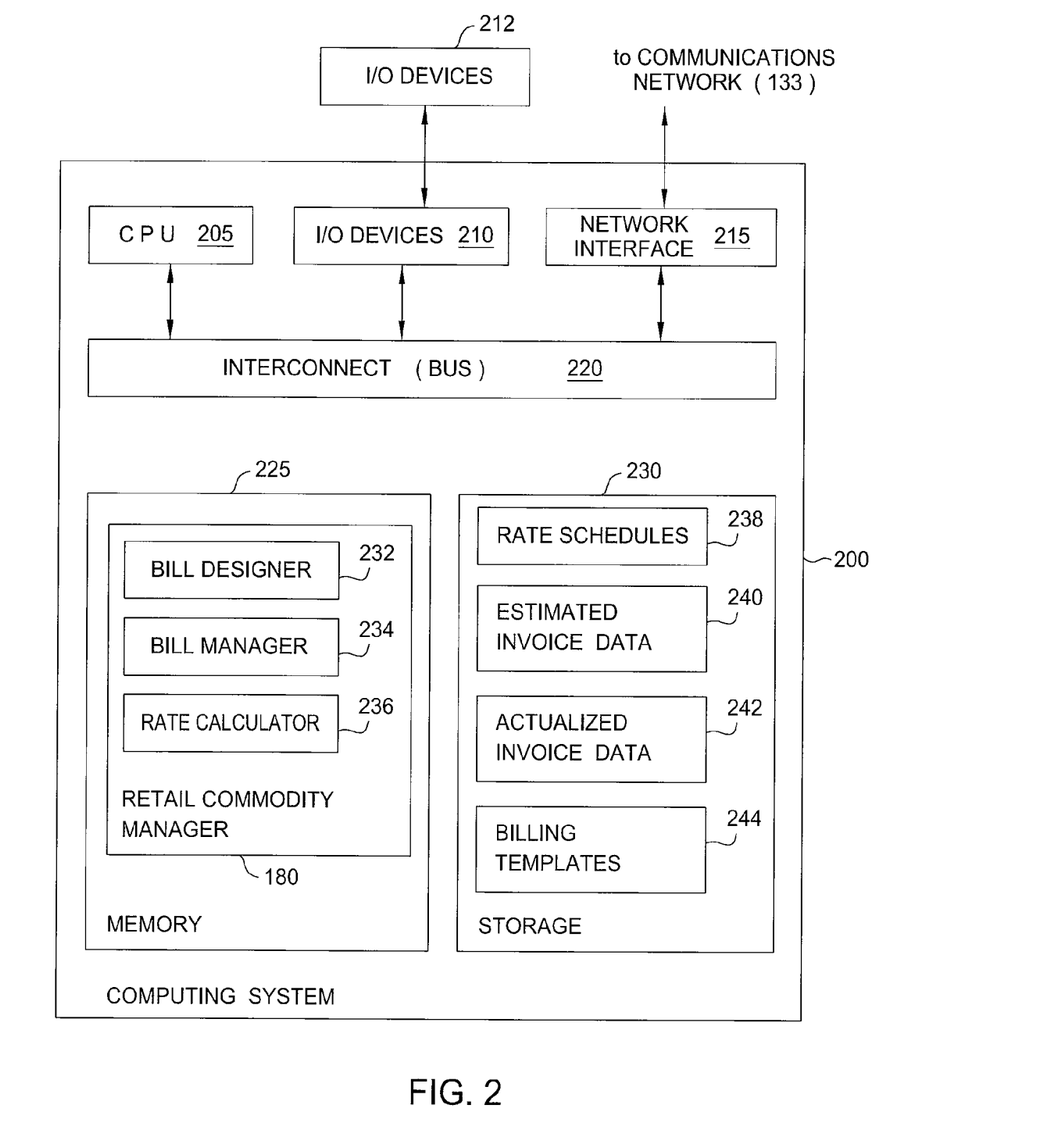
FIG. 2 is a more detailed view of one of the computing systems illustrated in FIG. 1, according to one embodiment of the invention.

FIG. 2 is a more detailed view of a computer system 200 which includes the retail commodity manager of FIG. 1, according to one embodiment of the invention. As shown, the computer system 200 includes, without limitation, a central processing unit (CPU) 205, a network interface 215, an interconnect 220, a memory 225, and storage 230. The computer system 200 may also include an I/O device interface 210 connecting I/O devices 212 (e.g., keyboard, display and mouse devices) to the computer system 200.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 contains the retail commodity manager 180, and the storage 230 contains a collection of rate schedules 238, estimated invoice data 240, and actualized invoice data 242. In one embodiment, the retail commodity manager 180 provides a software application which allows a pipeline operator to model invoices from a plurality of different commodity suppliers, based on the particular invoice, agreement, tariff, or other arrangement between the pipeline operator and supplier.

As shown, the retail commodity manager 180 includes a bill designer 232, a bill manager 234 and a rate calculator 236. In one embodiment, the bill designer 232 provides a user with a graphical user interface used to compose a collection of billing templates 244. Each billing template 244 may be modeled on an invoice format used by a given commodity supplier. For example, for an electrical supplier, the billing template 244 may include a set of line items for kilowatt hours of electricity consumed, for off-peak and on-peak demand amounts, for taxes and excise charges, etc. Note, the pipeline operator may have supply contracts with multiple electricity providers, and the bill designer 232 may be used to compose a distinct billing template 244 for each one. The rate calculator 226, may provide a graphical user interface which allows the user to specify the appropriate formula for calculating an estimated invoice amounts for any given field or line item within a billing template 244. As another example, for a natural gas supplier, the billing template 244 may include a set of line items for MMTBUs of gas delivered to the operator, and for a materials supplier, a mass or volume of commodities delivered to the operator. More generally, each billing template 244 may include a set of fields or line items tailored to correspond to the invoices format used by a particular commodity supplier.

Once a billing template 244 is specified for a given commodity supplier, the pipeline operator may use that billing template 244 to model invoices corresponding to commodity product obtained form that supplier using the bill manager 234. In one embodiment, the bill manager 234 provides a user with a graphical user interface used to generate (or supply) estimated invoice data 240 and actualized invoice data 242. For example, the user may specify a giving billing period for a selected billing template 244, i.e., the user may specify what commodity supplier's invoice to model for a given billing period. Returning to the example of electricity consumption for an ASU, the bill manager 234 would populate the fields of the billing template 244 using data obtained from the SCADA system—providing an estimate of amounts of commodity materials consumed by the pipeline operator for that billing period. Further, the rate calculator 236 may calculate an invoice amount for each line item of the invoice based on the rate schedules 238 for the selected commodity supplier and the data from the SCADA system. Importantly, the estimated invoice data 240 for the selected commodity supplier is presented using the invoice format of that commodity supplier. Alternatively, the user may enter estimates of commodity materials consumption and the rate calculator 236 may calculate the corresponding invoice amounts. This latter approach may be used by the pipeline operator to model different scenarios for commodity consumption. Further, if an actual invoice is available from the commodity supplier for the given period, the user may enter actualized invoice data 242 into the line items of the selected billing template 244. Alternatively, if the actual invoice data is supplied in a machine readable form (e.g., as a structured markup document processed by the bill manager), the bill manager 234 may parse the invoice data and populate the selected billing template 244 automatically.

Figure 3:
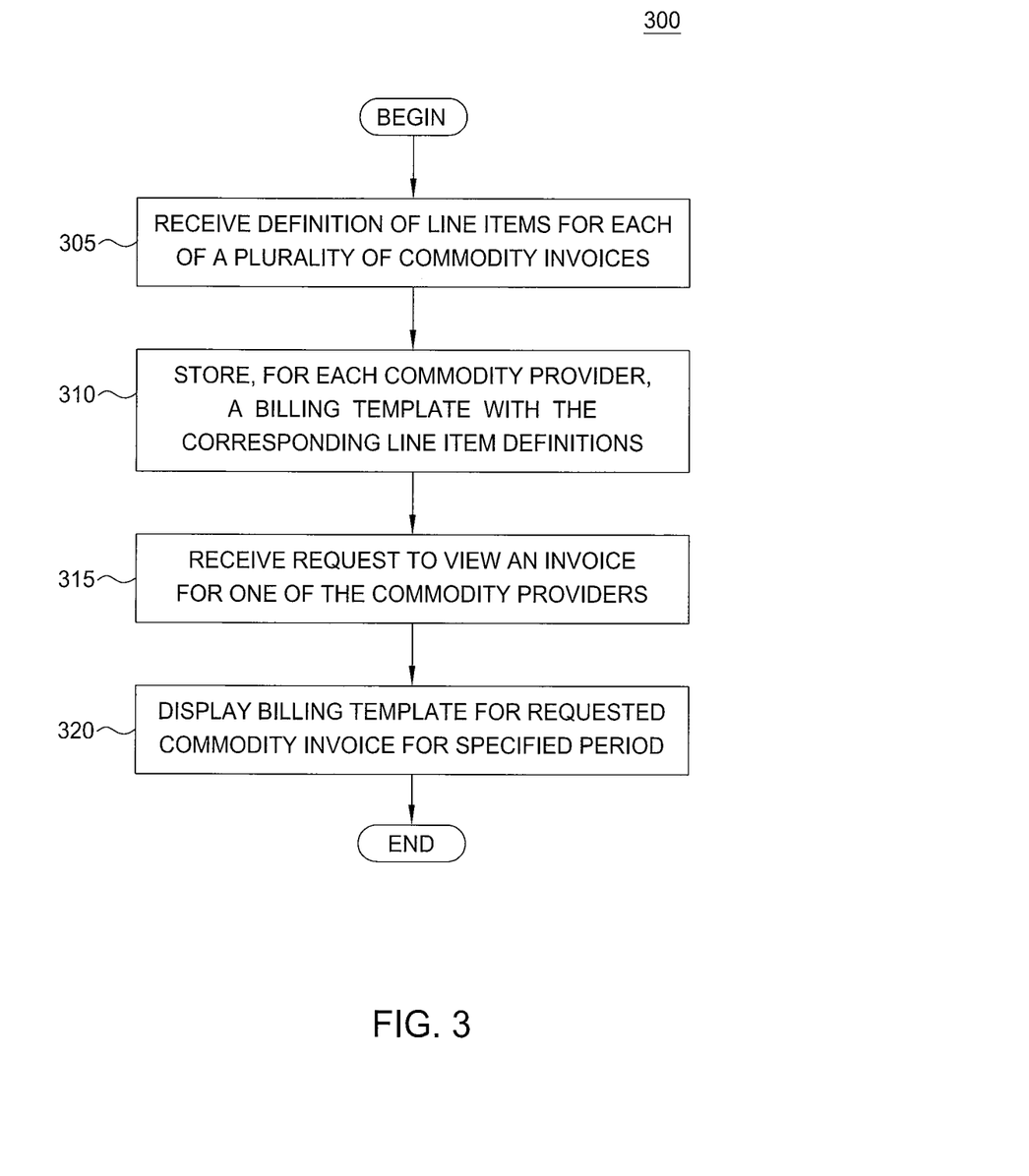
FIG. 3 illustrates a method for creating a collection of invoice templates used to model commodity materials costs related to the operations of an industrial system such as a pipeline, according to one embodiment of the invention.

FIG. 3 illustrates a method 300 for creating a collection of invoice templates used to model commodity materials costs related to the operations of an industrial system such as a pipeline, according to one embodiment of the invention. Although the method steps are described in conjunction with the systems of FIGS. 1 and 2, persons skilled in the art will understand that any system configured to perform the method steps, in any order, is within the scope of the invention.

As shown, the method 300 begins at step 305, where the retail commodity manager 180 receives a definition of a billing template 244 for each of a plurality of commodity suppliers. As noted above, the billing template 244 for each commodity supplier may include a set of fields or line items modeled on the actual invoice format used by a given commodity supplier. Further, the rate calculator 236 may be used to specify a formula for computing an invoice amount corresponding to a given field or line item of an invoice. Once completed, the retail commodity manager 180 may store the billing templates 244 and corresponding line item definitions (step 310). In one embodiment, the billing template 244 may include two corresponding sets of fields, one set of fields for estimates of commodity consumption populated, e.g., using SCADA data, and a second set of fields for actual invoice amounts populated, e.g., using invoices received from a given commodity supplier. This allows a user to compare the estimated amounts with an actual invoice, when it is received. Further, because the estimates are presented in the billing template 244 using the invoice format of that commodity supplier, a direct side-by-side comparison is possible.

At step 315, the retail commodity manager 180 receives a request to view an invoice for one of the commodity providers. For example, the user may interact with the bill manager 234 to request to view an invoice for the current month for the electricity obtained from a particular commodity supplier. In response, the retail commodity manager 180 retrieves the selected billing template 244 and displays the fields or line items to the user (step 320). Further, as described in greater detail below, the retail commodity manager 180 may populate the fields or line items of the selected billing template 244 using any available SCADA data (as estimated invoice data 240), and any available actual invoice amounts (as actualized invoice data 242), or user supplied data, as well as combinations thereof.

Figure 4:
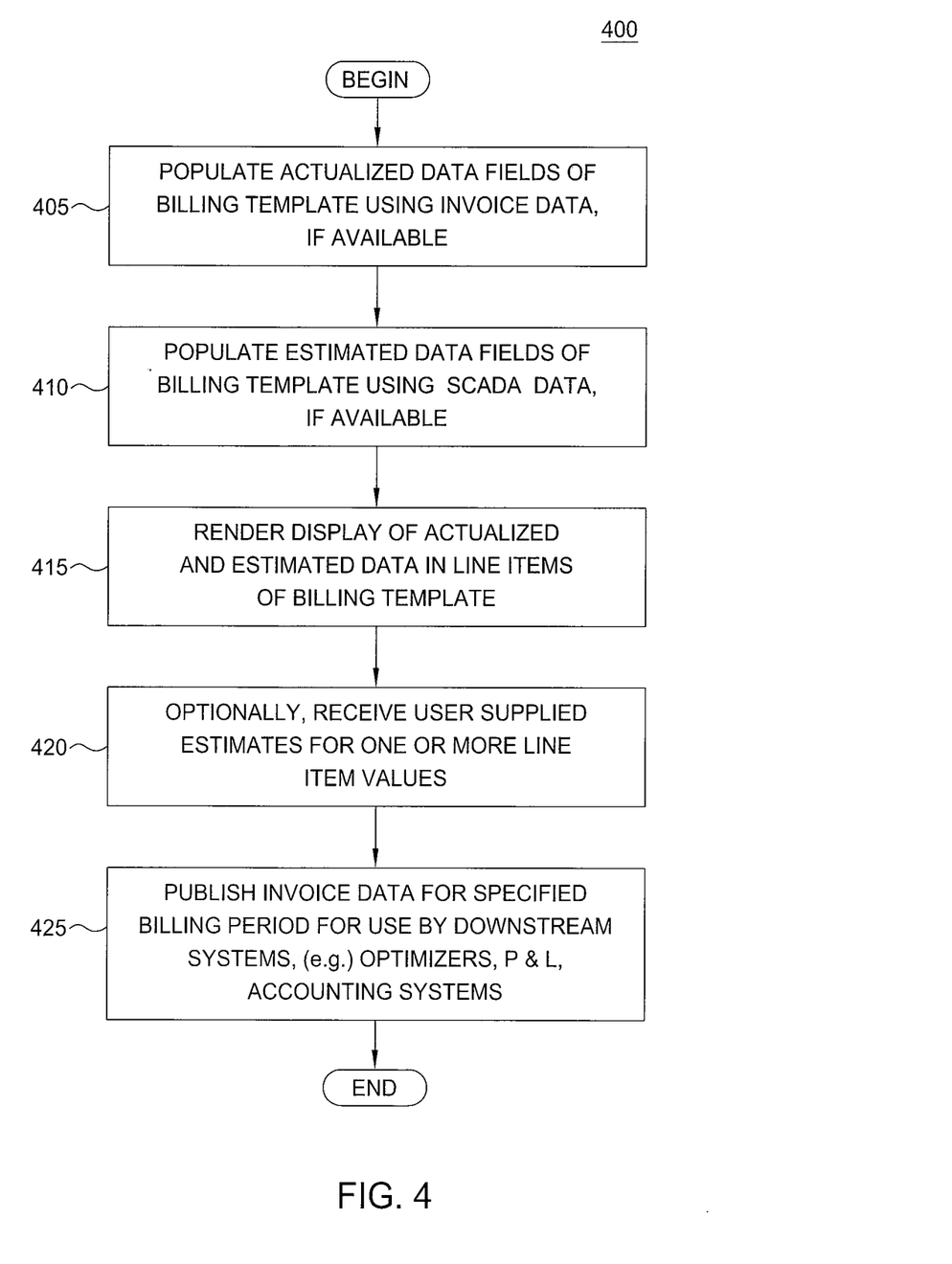
FIG. 4 illustrates a method for modeling an invoice of commodity material consumption within an industrial network such as a pipeline, according to one embodiment of the invention.

For example, FIG. 4 illustrates a method 400 for modeling an invoice of commodity material consumption within an industrial network such as a pipeline, according to one embodiment of the invention. As shown, the method 400 begins at step 405, where the retail commodity manager 180 populates fields of a selected billing template 244 using actualized invoice data (if available). At step 410, the retail commodity manager 180 populates fields of the billing template using estimated invoice data (if available). At step 415, the retail commodity manager 180 renders a display of the selected billing template where one set of fields is populated using the available estimated invoice data (if any) and another set of fields is populated using the available actualized data (if any).

Once the selected billing template is used to render an image of an invoice for a particular commodity supplier, the user may provide estimates for one or more of the line item values or fields of an invoice. Further, if the actual invoice data has not been previously entered (or parsed from a markup language document), the user may enter actual invoice data stored by the retail commodity manager 180 (step 420). Once entered, the user may have an electronic copy (e.g., a PDF file) of the actual invoice stored along with the actualized invoice data. The user may also change or update any of the estimated commodity consumption amounts. In response, the retail commodity manager 180 may use the rate calculator to update the line item amounts corresponding to any changed commodity consumption amounts.

At step 425, once the retail commodity manager 180 generates an invoice for the selected billing period—based on estimated data, actualized data, or combinations of both, the resulting invoice may be published to a database and accessed by a variety of systems at an operations control center. For example, as noted above, the invoices modeled using the retail commodity manager 180 may facilitate profit and loss sheet reporting as well as facilitate a billing system configured to invoice customers for the pass-through costs of certain commodity costs incurred by the pipeline operator. Further still, data from the commodity materials invoice system may be used to optimize the operations of the pipeline. In one embodiment, an optimization process may evaluate the estimated commodity costs to determine a recommended solution to where to obtain commodity products from during a given billing period. For example, the optimization process may be used to select from competing commodity suppliers. As another example, in the case of an ASU at a production facility, if the estimated invoice data indicated that the electricity consumption of the ASU was likely to exceed a contracted amount of electricity from a given supplier, leading to a premium being paid for additional consumption, the optimization process could shift production from that ASU to another, change to another commodity supplier, or otherwise change how the ASU is operating to avoid exceeding the contract amount of electricity.

Figure 5:
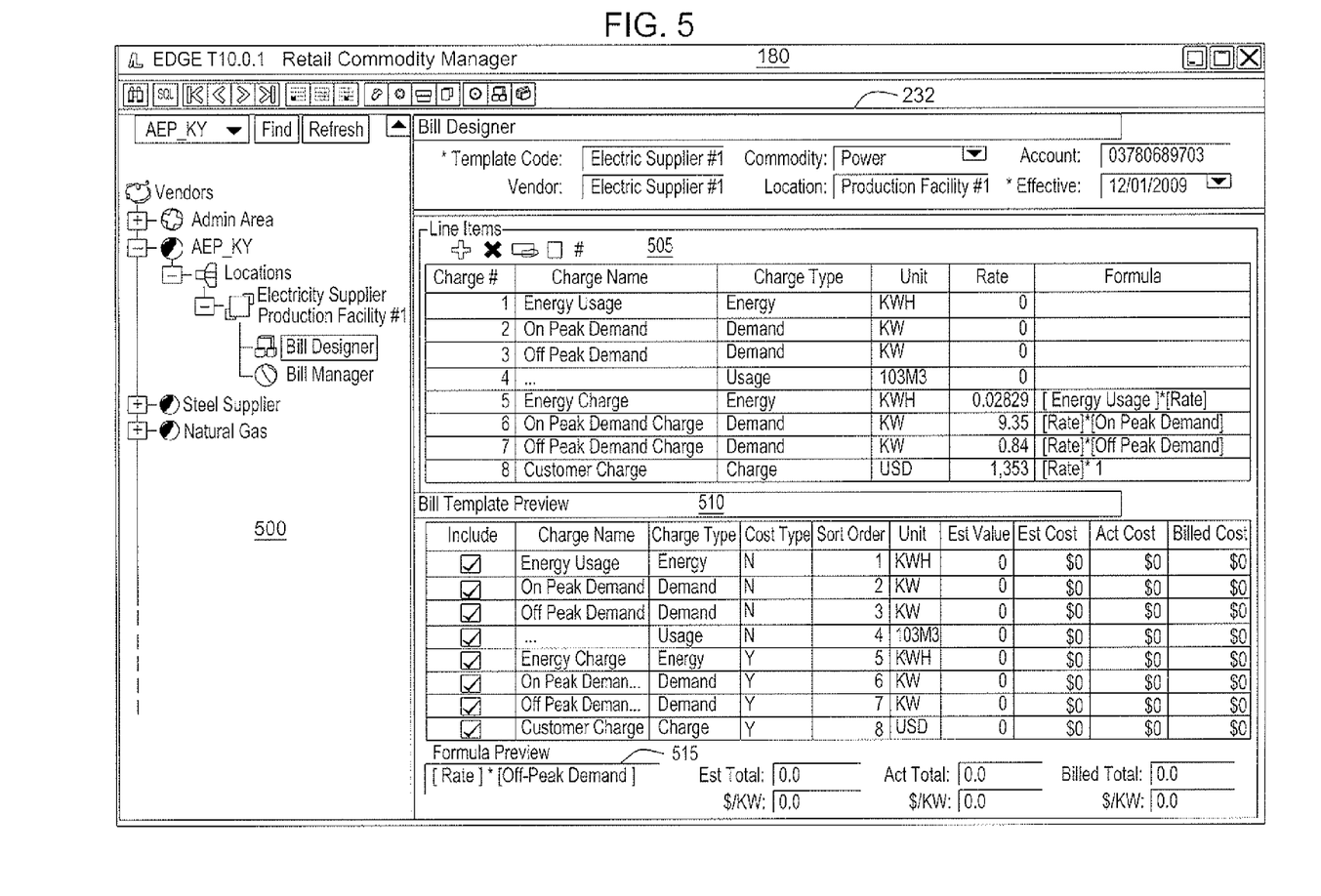
FIG. 5 illustrates an example user interface for a commodity invoice designer, according to one embodiment of the invention.
Figure 6:
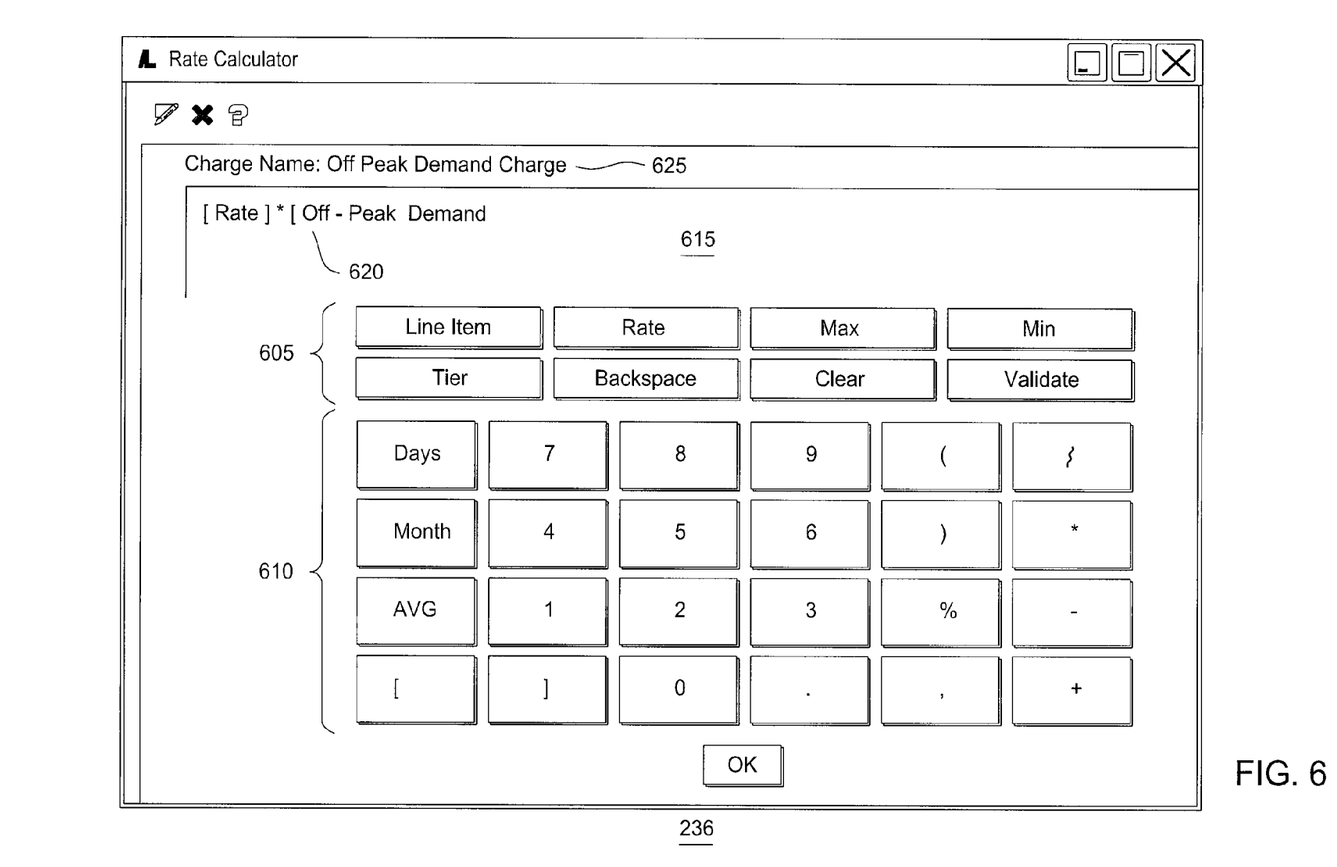
FIG. 6 illustrates an example user interface for a commodity invoice rate designer, according to one embodiment of the invention.

FIGS. 5-7 illustrate examples of user interfaces provided by the retail commodity manager 180, according to one embodiment of the invention. First, FIG. 5 shows an example of the bill designer 232 being used to compose a bill template modeling an invoice from an electric utility. As shown, the interface of the retail commodity manager 180 includes a tree view 500 that allows the user to select between different bill templates (or to create a new template). Illustratively, the user has expanded the tree view 500 to select an electricity supplier labeled "electricity supplier #1," resulting in sub element of "locations" being displayed. In this case, the user has selected "production facility #1."

Additionally, the retail commodity manager 180 shows the bill designer 232, along with a line items pane 505, a bill template preview pane 510, and a formula entry field 515. In this example, the bill designer 232 allows the user to specify a name, vendor, account, and type fields, etc., for a particular bill template 244. The line items pane 505 allows the user to specify each field to include in the billing template 244. Further, the formula entry field 515 allows a user to specify how an invoice amount should be calculated from one or more of the line item fields. As noted above, the line items specified in the line items pane 505 may correspond to the line items from an actual invoice from a given commodity supplier; in this example, an invoice from "electricity supplier #1" for electricity consumed at the "production facility #1." The bill template preview pane 510 allows a user to specify whether a given line item is included in a display of a given bill template or used as data in calculating one of the included line item fields.

FIG. 6 illustrates an example user interface for a commodity invoice rate designer, according to one embodiment of the invention. In particular, FIG. 6 shows an example of the rate calculator 236. As shown, the rate calculator 236 includes a display area 615 displaying a rate calculation 620 composed for a charge type named "off peak demand charge." Additionally, the rate calculator includes a set of rate calculation functions 605, and time periods 610, along with buttons used for numeric and arithmetic input. Of course, one of ordinary skill in the art will recognize that the particular assortment of rate calculation functions, and time periods, or other operations that may be specified using the rate calculator 236 may be tailored to suit the needs of a particular case.

FIG. 7 illustrates an example user interface for the retail commodity manager 180, according to one embodiment of the invention. Specifically, FIG. 7 shows an example of the bill manager 234 being used to view a bill template modeling an invoice from an electric utility. In this example, the view of the bill manager 234 corresponds to the bill template 244 composed using the interface to the bill designer 232 shown in FIG. 5. Thus, the view of the bill manager 234 includes the name, vendor, account, and type fields specified for the "electricity supplier #1" providing energy to the "production facility #1," along with information specifying a billed amount, an account number, a bill number, etc. Additionally, the view of the bill manager 234 also includes a billing period 725 with a starting and ending date.

As shown, the interface of the retail commodity manager 180 includes a tree view 705 that allows the user to select between different commodity suppliers and locations. For the selected location and commodity supplier, the bill manager 234 includes a set of line items 720, corresponding to each line item expected to be present in an invoice from the selected commodity supplier. Further, a set of estimated columns 710 is used to show the estimated invoice data 240 for each line item and a set of actualized columns 715 is used to show the actualized invoice data 242 for the selected commodity provider, location, and billing period. Thus, the view of the bill manager 234 allows a user to make a direct side-by-side comparison of the estimated and actualized invoice data.

Advantageously, embodiments of the invention provide techniques for managing aspects of a large industrial operation (such as a pipeline). As disclosed, a commodity materials invoice system allows a user to model a commodity invoice as a template and subsequently use that template to model commodity usage for different periods of time. Costs for a given billing period may be estimated based on actual commodity consumption. For example, data from a SCADA system monitoring different aspects of a pipeline may be used to estimate invoice costs for retail commodity consumption. The commodity materials invoice system may be configured to present both estimated and actualized invoice data side-by-side, allowing users to make a direct comparison of the estimated and actualized invoice data.

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method for managing commodity consumption within an industrial production facility, comprising:
    receiving a definition of a billing template for each of a plurality of commodity suppliers, wherein each commodity supplier provides a commodity material consumed by the industrial production facility, and wherein the billing templates each specify a set of line-items modeling an invoice received from a respective one of the commodity suppliers;
    receiving a request to view a populated instance of the billing template, for a specified billing period, for a selected one or more of the commodity suppliers;
    generating, by operation of one or more computer processors, a view of the requested instance of the billing template formatted according the billing template corresponding to the one or more selected commodity suppliers, wherein the view includes a first display area for rendering one or more of the set of line items as estimated invoice data and a second display area for rendering one or more of the set of line items as actualized invoice data;
    populating at least one of the set of line items in the first display area with estimates of commodity consumption for the specified billing period obtained from monitoring actual commodity consumption within the industrial production facility;
    evaluating the estimated commodity costs for the specified billing period to determine a recommended solution for commodity consumption within the industrial production facility during a subsequent billing period, wherein the recommended solution shifts production within the industrial production facility or changes commodity suppliers for the subsequent billing period;
    displaying, in response to the request to view the instance of the billing template, the generated view, including the first display area, the second display area, and the recommended solution; and
    storing the generated instance of the billing template in a database accessed by at least an accounting system and an optimizing system.

2. The method of claim 1, wherein at least one estimate of commodity consumption is obtained in response to user input specifying a value for the at least one line item.

3. The method of claim 1, further comprising, populating at least one of the set of line items in the second display area with an actualized value of commodity consumption for the specified billing period.

4. The method of claim 3, further comprising, storing, with the requested instance of the billing template, an electronic copy of an actual invoice received from the selected commodity supplier, for the specified billing period.

5. The method of claim 1, wherein the industrial production facility includes one or more air separation units used to generate product delivered through a pipeline.

6. The method of claim 5, wherein the commodity material is electrical power.

7. A non-transitory computer-readable medium containing a retail commodity manger, which when executed on a processor is configured to perform an operation for managing commodity consumption within an industrial production facility, the operation comprising:

receiving a request to view a populated instance of the billing template, for a specified billing period, for a selected one or more of the commodity suppliers;

generating a view of the requested instance of the billing template formatted according the billing template corresponding to the one or more selected commodity suppliers, wherein the view includes a first display area for rendering one or more of the set of line items as estimated invoice data and a second display area for rendering one or more of the set of line items as actualized invoice data;

populating at least one of the set of line items in the first display area with estimates of commodity consumption for the specified billing period obtained from monitoring actual commodity consumption within the industrial production facility;

evaluating the estimated commodity costs for the specified billing period to determine a recommended solution for commodity consumption within the industrial production facility during a subsequent billing period, wherein the recommended solution shifts production within the industrial production facility or changes commodity suppliers for the subsequent billing period;

displaying, in response to the request to view the instance of the billing template, the generated view, including the first display area, the second display area, and the recommended solution; and storing the generated instance of the billing template in a database accessed by at least an accounting system and an optimizing system.

8. The computer-readable medium of claim 7, wherein the estimate of commodity consumption is obtained in response to user input specifying a value for the at least one line item.

9. The computer-readable medium of claim 7, wherein the operation further comprises, populating at least one of the set of line items in the second display area with an actualized value of commodity consumption for the specified billing period.

10. The computer-readable medium of claim 9, wherein the operation further comprises, storing, with the requested instance of the billing template, an electronic copy of an actual invoice received from the selected commodity supplier, for the specified billing period billing.

11. A system, comprising:
a processor; and
a memory storing a retail commodity manger, which when executed on the processor performs an operation for managing commodity consumption within an industrial production facility, the operation comprising:

receiving a request to view a populated instance of the billing template, for a specified billing period, for a selected one or more of the commodity suppliers, generating a view of the requested instance of the billing template formatted according the billing template corresponding to the one or more selected commodity suppliers, wherein the view includes a first display area for rendering one or more of the set of line items as estimated invoice data and a second display area for rendering one or more of the set of line items as actualized invoice data, populating at least one of the set of line items in the first display area with estimates of commodity consumption for the specified billing period obtained from monitoring actual commodity consumption within the industrial production facility, evaluating the estimated commodity costs for the specified billing period to determine a recommended solution for commodity consumption within the industrial production facility during a subsequent billing period, wherein the recommended solution shifts production within the industrial production facility or changes commodity suppliers for the subsequent billing period, displaying, in response to the request to view the instance of the billing template, the generated view, including the first display area, the second display area, and the recommended solution, and storing the generated instance of the billing template in a database accessed by at least an accounting system and an optimizing system.

12. The system of claim 11, wherein the estimate of commodity consumption is obtained in response to user input specifying a value for the at least one line item.

13. The system of claim 11, wherein the operation further comprises, populating at least one of the set of line items in the second display area with an actualized value of commodity consumption for the specified billing period.

14. The system of claim 13, wherein the operation further comprises, storing, with the requested instance of the billing template, an electronic copy of an actual invoice received from the selected commodity supplier, for the specified billing period.

* * * * *